United States Patent
Zhang et al.

(10) Patent No.: US 10,992,595 B2
(45) Date of Patent: Apr. 27, 2021

(54) RESOURCE PUSHING METHOD, DEVICE, AND STORAGE MEDIUM FOR SMART DEVICE

(71) Applicant: BAIDU ONLINE NETWORK TECHNOLOGY (BEIJING) CO., LTD., Beijing (CN)

(72) Inventors: Mengmeng Zhang, Beijing (CN); Jingyu Ye, Beijing (CN); Xi Zhang, Beijing (CN); Hualong Zu, Beijing (CN); Xinya Zhang, Beijing (CN); Lingjin Xu, Beijing (CN); Xiaochen Jia, Beijing (CN); Sunhonglu Dong, Beijing (CN); Zhongji Fan, Beijing (CN); Li Wan, Beijing (CN); Bo Zhang, Beijing (CN); Liuhui Zhang, Beijing (CN); Wenming Wang, Beijing (CN); Jiaguang Lu, Beijing (CN); Shuai Wang, Beijing (CN); Gang Zhang, Beijing (CN); Qiang Ju, Beijing (CN); Xiaonan He, Beijing (CN); Wensong He, Beijing (CN); Yafei Miao, Beijing (CN)

(73) Assignee: BAIDU ONLINE NETWORK TECHNOLOGY (BEIJING) CO., LTD.

( * ) Notice: Subject to any disclaimer, the term of this patent is extended or adjusted under 35 U.S.C. 154(b) by 0 days.

(21) Appl. No.: 16/564,028

(22) Filed: Sep. 9, 2019

(65) Prior Publication Data
US 2020/0007461 A1    Jan. 2, 2020

(30) Foreign Application Priority Data
Nov. 1, 2018   (CN) .......................... 201811294676.0

(51) Int. Cl.
*H04L 12/919* (2013.01)
*G06F 16/9035* (2019.01)
(Continued)

(52) U.S. Cl.
CPC ........ *H04L 47/765* (2013.01); *G06F 16/9035* (2019.01); *G10L 15/22* (2013.01);
(Continued)

(58) Field of Classification Search
CPC ... H04L 47/765; H04L 47/762; H04L 47/783; H04L 47/808; H04L 47/821;
(Continued)

(56) References Cited

U.S. PATENT DOCUMENTS

| | | | |
|---|---|---|---|
| 2006/0143647 A1* | 6/2006 | Bill ........................ | G06F 16/683 725/10 |
| 2015/0242518 A1* | 8/2015 | Rosenbaum ........... | G06Q 50/01 707/710 |

(Continued)

FOREIGN PATENT DOCUMENTS

| CN | 106131601 A | 11/2016 |
|---|---|---|
| CN | 106326486 A | 1/2017 |

(Continued)

OTHER PUBLICATIONS

First Office Action in JP Patent Application No. 2019170618 dated Aug. 28, 2020.

*Primary Examiner* — James E Springer
(74) *Attorney, Agent, or Firm* — Dilworth IP, LLC (57) ABSTRACT

The present disclosure provides a resource pushing method, a device and a storage medium for a smart device, the method includes: acquiring a first pushing resource according to a preset rule, where the first pushing resource is used by the smart device to interact with a user, pushing the first pushing resource to the user. In the solution, relevant (Continued)

resources are actively acquired according to behavior information of the user, triggering and hotspots, and are pushed to the user, thereby saving the cost in resource querying by the user, and increasing the exposure of platform resources.

18 Claims, 4 Drawing Sheets

(51) Int. Cl.
  *G10L 15/22* (2006.01)
  *H04L 12/923* (2013.01)
  *H04L 12/911* (2013.01)
  *H04L 12/927* (2013.01)
(52) U.S. Cl.
  CPC .......... *H04L 47/762* (2013.01); *H04L 47/783* (2013.01); *H04L 47/808* (2013.01); *H04L 47/821* (2013.01); *H04L 47/822* (2013.01); *H04L 47/827* (2013.01); *G10L 2015/223* (2013.01); *G10L 2015/225* (2013.01)
(58) Field of Classification Search
  CPC ..... H04L 47/822; H04L 47/827; G10L 15/22; G10L 2015/223; G10L 2015/225; G06F 16/9035
  USPC .......................................................... 709/226
  See application file for complete search history.

(56) References Cited

U.S. PATENT DOCUMENTS

| | | | |
|---|---|---|---|
| 2016/0066064 A1* | 3/2016 | Chesluk | H04N 21/23418 |
| | | | 725/93 |
| 2017/0324807 A1* | 11/2017 | Gu | H04L 67/2804 |
| 2017/0339246 A1* | 11/2017 | Gu | H04L 65/1063 |
| 2018/0188054 A1* | 7/2018 | Kennedy | G08G 1/09675 |
| 2018/0247347 A1* | 8/2018 | McNabb | G06F 11/302 |
| 2019/0147051 A1* | 5/2019 | Lu | G06F 16/635 |
| | | | 704/275 |
| 2019/0332694 A1* | 10/2019 | Tcherechansky | G06F 16/2365 |

FOREIGN PATENT DOCUMENTS

| | | |
|---|---|---|
| CN | 106878405 A | 6/2017 |
| CN | 108121738 A | 6/2018 |
| CN | 108134950 A | 6/2018 |
| CN | 108200116 A | 6/2018 |
| JP | 2008018756 A | 1/2008 |
| JP | 2017157130 A | 9/2017 |

\* cited by examiner

FIG. 8

RESOURCE PUSHING METHOD, DEVICE, AND STORAGE MEDIUM FOR SMART DEVICE

CROSS-REFERENCE TO RELATED APPLICATION

The present application claims priority to Chinese application number 201811294676.0, filed on Nov. 1, 2018, which is incorporated by reference in its entirety.

TECHNICAL FIELD

Embodiments of the present disclosure relate to a field of artificial intelligence technologies, and in particular, to a resource pushing method, a device and a storage medium for a smart device.

BACKGROUND

With the rapid development of artificial intelligence and smart devices, more and more users use smart devices for information querying and media resource acquiring. However, in the current smart device, the way in which users acquire related resources may only be to input keywords and click on the query, and the content of the queried resources needs to be filtered one by one to acquire what they need. Besides, since there are a huge amount of resources in a network and users rely on manpower to find the resources they need, therefore, the efficiency is extremely low, and the cost for finding resources is high.

SUMMARY

Embodiments of the present disclosure provide a resource pushing method, a device and a storage medium for a smart device, for solving the problem that the user acquires resources in the above manner with a low efficiency and high costs.

A first aspect of the present disclosure provides a resource pushing method for a smart device, including:
acquiring a first pushing resource according to a preset rule, where the first pushing resource is used by the smart device to interact with a user; and
pushing the first pushing resource to the user.
In an implementation, the preset rule includes at least one of following:
determining a pushing resource according to a news hotspot;
determining a pushing resource according to behavior information of the user;
determining a pushing resource according to a keyword of user feedback;
determining a pushing resource according to an identity of the user; and
determining a pushing resource according to subscription information of the user.
In an implementation, before the acquiring a first pushing resource according to a preset rule, the method includes:
acquiring a first voice of the user;
the acquiring a first pushing resource according to a preset rule includes:
acquiring the first pushing resource according to the first voice of the user and the preset rule.
In an implementation, where the acquiring the first pushing resource according to the first voice of the user and the preset rule includes:
acquiring the first pushing resource to be pushed according to the first voice and a news hotspot, where the preset rule includes determining a pushing resource according to a news hotspot; or,
acquiring the first pushing resource to be pushed according to the first voice and behavior information of the user of the user, where the preset rule includes determining a pushing resource according to behavior information of the user; or,
acquiring the first pushing resource to be pushed according to a keyword in the first voice, where the preset rule includes determining a pushing resource according to a keyword; or,
determining, according to the first voice, whether an identity of the user is an adult or a child; acquiring a plurality of resources according to the first voice, and removing resources that are inconsistent with the identity of the user from the plurality of resources to acquire the first pushing resource, where the preset rule includes determining a pushing resource according to an identity of the user.
In an implementation, where the acquiring the first pushing resource to be pushed to the user that interacts with the smart device according to the preset rule includes:
acquiring the first pushing resource to be pushed according to a news hotspot, where the preset rule includes determining a pushing resource according to a news hotspot; or,
acquiring the first pushing resource to be pushed according to behavior information of the user of the user, where the preset rule includes determining a pushing resource according to behavior information of the user; or,
collecting a voice of the user, determining whether an identity of the user is an adult or a child according to the voice, and acquiring the first pushing resource according to the identity of the user, where the preset rule includes determining a pushing resource according to an identity of the user; or,
acquiring the first pushing resource according to subscription information of the user, where the preset rule includes determining a pushing resource according to subscription information of the user.
In an implementation, the behavior information of the user includes at least one of following:
time information, location information, historical resource access information, and weather information.
In an implementation, the method further includes:
acquiring feedback information for the first pushing resource from the user, where the feedback information is information indicating an attitude of the user toward the first push resource.
In an implementation, the method further includes:
if it is determined, according to the feedback information, that the user has a positive attitude toward the first pushing resource, after the first pushing resource is played, acquiring at least one second pushing resource related to the first pushing resource pushing to the user.
In an implementation, if it is determined according to the feedback information that the user has a negative attitude toward the first pushing resource, the method further includes:
exiting a resource pushing process; or,
playing a guidance voice used to query an attitude of the user, acquiring a second voice of the user, and acquiring a third pushing resource according to the second voice to push to the user; or,
playing the first pushing resource.

In an implementation, the method further includes:

if the attitude of the user toward the pushed first pushing resource cannot be determined according to the feedback information, re-acquiring a fourth pushing resource to be pushed according to the preset rule and the feedback information;

pushing the fourth pushing resource to the user.

In an implementation, if a number of times for which an attitude of the user toward a resource cannot be determined according to the feedback information exceeds a preset number of times, the method further includes:

exiting the resource pushing process; or, playing a guidance voice used to query an attitude of the user, acquiring a third voice of the user, and acquiring a fifth pushing resource according to the third voice to push to the user; or, playing the first pushing resource.

In an implementation, where the acquiring feedback information for the first pushing resource from the user includes:

collecting and acquiring a fourth voice of the user, where the fourth voice is a voice of the user after pushing the first pushing resource; and acquiring the feedback information according to the fourth voice.

In an implementation, where the acquiring feedback information for the first pushing resource from the user includes:

acquiring the feedback information according to an operation of the user in a process of playing the first pushing resource.

In an implementation, a number of resources in the first pushing resource is plural, before pushing the first pushing resource to the user, the method further includes:

sorting the plurality of resources in the first pushing resource.

In an implementation, where the sorting the plurality of resources in the first pushing resource includes:

sorting the plurality of resources in the first pushing resource according to at least one of a number of times of browsing, a similarity, and popularity of each resource.

In an implementation, where the pushing the first pushing resource to the user includes at least one of following ways:

displaying resource information in the first pushing resource; or, playing a plurality of resources in the first pushing resource in order; or, performing voice broadcasting in order according to the plurality of resources in the first pushing resource.

A second aspect of the present disclosure provides a smart device, including:

a processing module, configured to acquire a first pushing resource according to a preset rule, where the first pushing resource is used by the smart device to interact with a user; and a pushing module, configured to push the first pushing resource to the user.

In an implementation, the preset rule includes at least one of following:

determining a pushing resource according to a news hotspot;

determining a pushing resource according to behavior information of the user;

determining a pushing resource according to a keyword of user feedback, determining a pushing resource according to an identity of the user; and determining a pushing resource according to subscription information of the user.

In an implementation, the smart device further includes:

a first acquiring module, configured to acquire a first voice of the user;

the processing module is specifically configured to acquire the first pushing resource according to the first voice of the user and the preset rule.

In an implementation, the behavior information of the user includes at least one of following:

time information, location information, historical resource access information, and weather information.

In an implementation, the smart device further includes:

a second acquiring module, configured to acquire feedback information for the first pushing resource from the user, where the feedback information is information indicating an attitude of the user toward the first push resource.

In an implementation, the processing module is further configured to:

if it is determined, according to the feedback information, that the user has a positive attitude toward the first pushing resource, after the first pushing resource is played, acquire at least one second pushing resource related to the first pushing resource push to the user.

In an implementation, if it is determined according to the feedback information that the user has a negative attitude toward the first pushing resource, the processing module is further configured to: exit a resource pushing process; or, the smart device further includes: a playing module, configured to play a guidance voice used to query an attitude of the user; the second acquiring module is further configured to acquire a second voice of the user; the processing module is further configured to: acquire a third pushing resource according to the second voice to push to the user through the pushing module; or, the smart device further includes: a playing module, configured to play the first pushing resource.

In an implementation, if the attitude of the user toward the pushed first pushing resource cannot be determined according to the feedback information, the processing module is further configured to: re-acquire a fourth pushing resource to be pushed according to the preset rule and the feedback information; and the pushing module is further configured to push the fourth pushing resource to the user.

In an implementation, if a number of times for which an attitude of the user toward a resource cannot be determined according to the feedback information exceeds a preset number of times, the processing module is further configured to: exit the resource pushing process; or, the smart device further includes: a playing module, configured to play a guidance voice used to query an attitude of the user; the second acquiring module is further configured to collect a third voice of the user; the processing module is further configured to acquire a fifth pushing resource according to the third voice to push to the user through the pushing module; or, the smart device further includes: a playing module, configured to play the first pushing resource.

In an implementation, the second acquiring module is specifically configured to:

acquire a fourth voice of the user, where the fourth voice is a voice of the user after pushing the first pushing resource; and acquire the feedback information according to the fourth voice.

In an implementation, the second acquiring module is specifically configured to:

acquire the feedback information according to an operation of the user in a process of playing the first pushing resource.

In an implementation, where a number of resources in the first pushing resource is plural, before pushing the first pushing resource to the user, the processing module is further configured to:

sort the plurality of resources in the first pushing resource according to at least one of a number of times of browsing, a similarity, and popularity of each resource.

In an implementation, the pushing module includes at least one of following submodules:

a displaying submodule, configured to display resource information in the first pushing resource; or, a playing submodule, configured to play a plurality of resources in the first pushing resource in order; or, a voice playing submodule, configured to perform voice broadcasting in order according to the plurality of resources in the first pushing resource.

A third aspect of the present disclosure provides a smart device, including a processor, a memory, a player, and a computer program; the computer program is stored in the memory, the processor executes the computer program to implement the resource pushing method for a smart device according to any implementation of the first aspect.

A fourth aspect of the present disclosure provides a computer readable storage medium, the computer readable storage medium stores a computer program, the computer program is used to implement the resource pushing method for a smart device according to any implementation of the first aspect.

In the resource pushing method, device and storage medium for a smart device according to the present disclosure, the smart device acquires a first pushing resource according to a preset rule, where the first pushing resource is used by the smart device to interact with a user, and pushes the first pushing resource to the user. In the solution, relevant resources are actively acquired and pushed to the user according to behavior information of the user, triggering and hotspots, in this way, there is no need to manually screen from a large number of resources, thus saving the cost in resource querying by the user, and increasing the exposure of platform resources.

BRIEF DESCRIPTION OF THE DRAWINGS

In order to more clearly illustrate the embodiments of the present disclosure or the technical solutions in the prior art, a brief description of the drawings used in the embodiments or the prior art description will be briefly described below, obviously, the drawings in following description are some embodiments of the present disclosure, and those skilled in the art can acquire other drawings according to the drawings without any inventive labor.

DETAILED DESCRIPTION OF THE EMBODIMENTS

In order to make the purpose, technical solution and advantages of the embodiments of the present disclosure more clear, the technical solution in the Embodiments of the present disclosure will be clearly and completely described below with reference to the drawings in the Embodiments of the present disclosure, obviously, the described embodiments are part of the embodiments of the present disclosure, and not all of the embodiments. Based on the embodiments in the present disclosure, all other embodiments acquired by those skilled in the art without creative efforts are within the scope of the present disclosure.

In current technical solutions, the way in which users acquire related resources can only be to input a keyword and click on the query, since there are a huge amount of queried resources, and users need to filter one by one to acquire the content they need, the cost for finding resources is high. Regarding this technical problem, the present disclosure provides a way to push resources, where a smart device acquires, based on a preset rule, a resource from a network or a database pushed to the user interacting with the smart device, and pushes the resource to the user. In this way, there is no need to manually input a keyword by the user to conduct a search, nor is there a need to manually screen from a large number of resources, thus saving the cost in resource querying by the user, and increasing the exposure of platform resources.

In the following, the resource pushing method will be described in detail through specific implementations.

Figure 1:
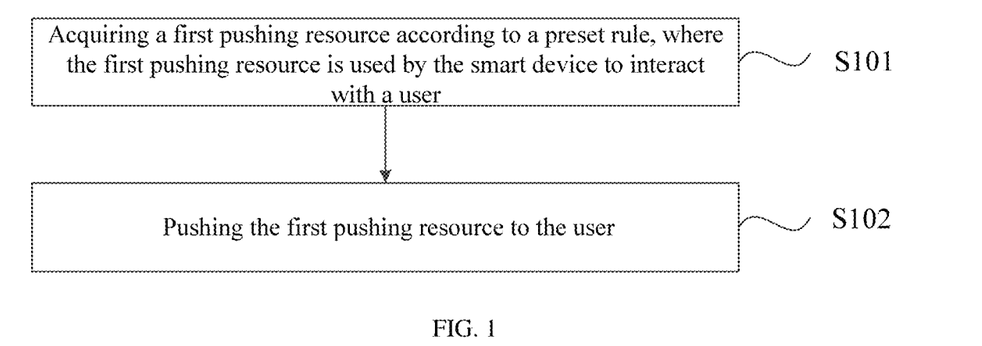
FIG. 1 is a flowchart of Embodiment 1 of a resource pushing method for a smart device according to an embodiment of the present disclosure.

FIG. 1 is a flowchart of Embodiment 1 of a resource pushing method for a smart device according to an embodiment of the present disclosure. The resource pushing method can be applied to a smart device, the smart device can be a smart television, a smart speaker, a robot, and other smart home devices, mobile phones, tablet computers, and the like, For example, it can be applied to Xiaodu speakers, Xiaodu robots, specifically, as shown in FIG. 1, the resource pushing method includes the following steps:

S101: acquiring a first pushing resource according to a preset rule, where the first pushing resource is used by the smart device to interact with a user.

In this step, the smart device can acquire the first pushing resource pushed to the user from a network and databases or resource libraries according to the preset rule, the number of resources in the first pushing resource may be one or more, which is not limited herein. The user can be an associated user who logs in to the smart device, or a device that interacts with the smart device for the first time, the specific interaction mode can be to perform a voice interaction directly or through an interface device.

In an implementation, in a specific implementation, the process of acquiring the first pushing resource may be as follows: when a voice is triggered, before the step, the smart device needs to acquire the first voice of the user, the specific process of acquiring the first pushing resource may be to acquire the first pushing resource according to the first voice of the user and the preset rule.

In the specific implementations of any of the above solutions, the preset rule includes following cases:

in the first case, determining a pushing resource according to a news hotspot.

The meaning of the solution is that, the smart device determines, from the news resources in the network, the first pushing resource that can be pushed to the user according to hot events occurring during a period of time or the hottest resources, the first pushing resource can be sports, technologies, finance, politics, entertainment and other resources.

In the second case, determining a pushing resource according to behavior information of the user.

In the solution, the smart device can determine the resource to be pushed to the user according to the behavior information of the user interacting with it, the behavior information of the user includes at least one of following: a user's historical resource access information (including an access record), a location where the user is located, that is, location information, a current weather condition, a current time period of the user, i.e., time information and so forth, which can be used as the behavior information of the user to determine the resource that will be recommended to the user.

In the third case, determining the pushed resource based on a keyword of user feedback.

In the solution, determining the resource to be pushed to the user still needs to be triggered by the user, for example, by the keyword in the voice of the user, or the keyword entered by the user, etc. In a specific implementation, the smart device collects the voice of the user, identifies one or more keywords involved therein, and acquires the resource to be pushed from the network or the databases according to the keywords.

In the fourth case, determining the pushed resources based on an identity of the user.

In the solution, the resources to be pushed to the user needs to be filtered, so as to avoid pushing inappropriate resources, generally, recognizing whether the user is an adult or a child based on the voice of the user, after determining the resource based on the hotspot or triggering from the user or the behavior information of the user, continuing to filter based on the identity of the user, for example, when the user is a child, the resource that is not suitable for the child to access or watch is removed, and the remaining resource is determined as the resource to be pushed.

In the fifth case, acquiring a pushed resource based on subscription information of the user.

In the solution, the user can pre-subscribe in the smart device according to his own needs, or subscribe to the required information through an APP in another smart device, after determining that the user has desired information, the smart device acquires the resource to be pushed to the user according to the subscription information, For example, the user can subscribe to daily weather forecasts, news, financial news, traffic information, etc., in addition to the sending of the resource subscribed by the user, more relevant information may be acquired in combination with the subscription information and may be pushed to the user, for example, in rainy days, in addition to the weather forecast, the user can be reminded to wear more clothes, to carry an umbrella or the user can be reminded of congestion information on work roads, which will not be limited herein.

S102: pushing the first pushing resource to the user.

In the various ways described above, after acquiring the first pushing resource to be pushed, the smart device may push the first pushing resource to the user, the solution is not limited herein regarding the specific push method. In general, there are at least the following ways to push the resource to the user, in the specific resource pushing process, several push ways can be combined at the same time to implement the pushing:

In one way, the smart device can display the resource information in the first pushing resource. For example, the queried first pushing resource is some related TV dramas or movies, etc., and the information such as titles and poster covers of the TV dramas or movies can be displayed, or the first pushing resource is some documents, or novels, or news, etc., then titles and authors of the novels or titles of the documents and news can be displayed. In an implementation, in the solution, the resources can be displayed after sorting, and the sorting can be implemented according to the hot of the resource per se, the number of openings, the similarity, and the like.

In another way, the plurality of resources in the first pushing resource can be played in order. In the solution, if the resources acquired by the smart device are videos, short videos, movies or television dramas, music MVs, music, images, or text resources such as novels and so forth, they can be played in order, thus allowing the user to choose to switch to the next resource for playback or exit. Similarly, the sorting in the solution may also be implemented according to at least one of a click rate of the resource per se, the number of openings by the user, the similarity, the hot, and the like.

In another way, the plurality of resources in the first pushing resource may be sequentially broadcasted in the form of voice. In the solution, the smart device can broadcast all the resources (such as news, facts, audios, videos, texts, etc.) in the form of voice, so that the user can directly receive the pushed resources, similar to the above two solutions, the sorting in the solution can also be implemented according to at least one of a click rate of the resource per se, the number of openings by the user, the similarity, the hot, and the like.

In a specific implementation of the above solution, the pushing method for the resource may also be triggered by the voice of the user. For the smart device, it needs to acquire the voice of the user, perform voice recognition to recognize the resource required by the user, and then acquire the resource required by the user in the database according to the voice, and push the acquired resource to the user. The main pushing method is voice broadcasting, and it can also display the resource. In this implementation, where the smart device needs to acquire the recommended resource to the user may include acquiring the first pushing resource to be pushed according to the first voice and a news hotspot; where the preset rule includes determining a pushing resource according to a news hotspot; or, acquiring the first pushing resource to be pushed according to the first voice and the behavior information of the user; where the preset rule includes determining a pushing resource according to the behavior information of the user; or, acquiring the first pushing resource to be pushed according to a keyword in the first voice, where the preset rule including determining a pushing resource according to a keyword; or, determining an identity of the user as an adult or a child based on the first voice; acquiring a plurality of resources according to the first voice, and removing resources that are inconsistent with the identity of the user from the plurality of resources, and acquiring the first pushing resource, where the preset rule includes determining a pushing resource according to an identity of the user.

In the resource pushing method provided by the embodiment, according to the preset rule, the smart device actively acquires, based on the behavior information of the user, the trigger, the hotspot and so forth, the first pushing resource to be pushed to the user interacting with the smart device, and pushes the first pushing resource to the user. In this way, there is no need to manually input a keyword by the user to conduct a search, nor is there a need to manually screen from a large number of resources, thus saving the cost in resource querying by the user, and increasing the exposure of platform resources.

Figure 2:
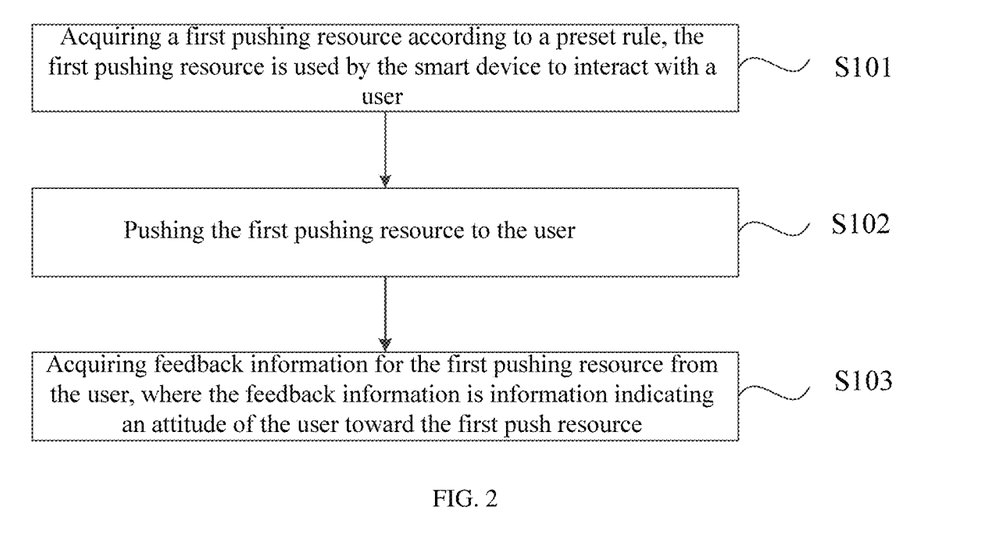
FIG. 2 is a flowchart of Embodiment 2 of a resource pushing method for a smart device according to an embodiment of the present disclosure.

FIG. 2 is a flow chart of a second embodiment of a resource pushing method for a smart device according to an embodiment of the present disclosure. As shown in FIG. 2, based on the foregoing embodiment, the resource pushing method for a smart device provided by the present disclosure further includes following steps:

S103: acquiring feedback information for the first pushing resource from the user, where the feedback information is information indicating an attitude of the user toward the first push resource.

In the solution, after pushing the first pushing resource to the user, the smart device can acquire the feedback information of the user on the resource, the feedback information is used to determine whether the user is satisfied with the pushed resource, that is, to determine the attitude of the user. Generally, the acquiring the feedback information may be to acquire according to an operation of the user or a voice recognition of the user, which at least includes following two implementations:

In the first implementation: collecting and acquiring a voice of the user (that is, the fourth voice), the voice is the voice of the user after the first pushing resource is pushed, and acquiring the feedback information according to the voice.

After the user expresses his evaluation of the pushed resource in the form of voice, the smart device needs to acquire the voice of the user, and perform processes such as voice recognition and semantic understanding to determine whether the user has a positive attitude or a negative attitude, or a neutral attitude, for example, if the user says "very good", it indicates a positive attitude; if the user says "do not like these things", it indicates a negative attitude; if the user says "change one", then it cannot be determined whether the user is satisfied with the current resource, which is a neutral attitude.

In the second implementation, acquiring the feedback information according to an operation of the user in a process of playing the first pushing resource. In the solution, the smart device can determine the attitude of the user according to the operation of the user in a process of pushing the first pushing resource, taking a video or an audio as an example, if the resource is being played, the user exits the play through an operation, a voice control or a remote control, etc., it is thus determined that the user has indicated a negative attitude, if the user has fully enjoyed the video or audio, it can be determined that the user has indicated a positive attitude, if the user just flips through or browses through the resource, or switches directly to the next video without watching the resource, in this case, the attitude of the user cannot be determined at this time, which can be considered as a neutral attitude.

The present disclosure does not limit the acquiring of the user's attitude to the above two methods, the core of the solution is that the user can give feedback on the pushed resource, and the smart device can continuously acquire the feedback information of the user and proceed to the next step.

After the feedback information of the user is acquired by the smart device, some corresponding processing may be performed according to the attitude of the user in the feedback information, specifically:

If it is determined, according to the feedback information, that the user has a positive attitude toward the first pushing resource, after playing the first pushing resource, acquiring at least one second pushing resource related to the first pushing resource and pushing it to the user.

If the smart device determines, according to the feedback information, that the user has a positive attitude toward the first pushing resource, then one or more resources in the first pushing resource can be played or broadcasted, and a plurality of second pushing resources related to the first pushing resource can be acquired after the playing is completed and pushed to the user. For example, according to "Andy Lau" in the voice of the user, acquiring a lot of popular songs of Andy Lau, and playing them in order of hot, if the positive of the user lasts throughout the process, then continuing to get old songs similar to Andy Lau's songs, Andy Lau's related music, Andy Lau's movies and other related resources to the user and pushing them to the user. If the solution is applied to a smart robot, or a smart speaker, etc., voice guidance can also be implemented to make the device more anthropomorphic, for example, playing a guidance voice of "Do you want to know about Andy Lau's movie", etc., and then continuing to collect voices to continuously interact with the user.

If it is determined according to the feedback information that the user has a negative attitude toward the first pushing resource, the smart device can process as follows: exit a resource pushing process; or, play a guiding voice used to query an attitude of the user, collect a second voice of the user, and acquire a third pushing resource according to the second voice to push to the user; or, play the first pushing resource.

In the solution, if the user has a negative attitude toward the pushing resource, the smart device can exit the resource recommendation process, or query the user's preferences so that it can better recommend the resources required by the user and continue playing the first pushing resource. Take multiple interactions with the user as an example, the smart device can play a guidance voice, for example, query the user with the questions such as "What else do you want to know?" "Do you want to know *" "In fact, Xiaodu is very smart, if you don't like Andy Lau, I can still look for a song of * for you", etc., in order to further understand the user's preferences, which is not limited herein.

If the attitude of the user toward the pushed first pushing resource cannot be determined according to the feedback information, re-acquiring a fourth pushing resource to be pushed according to the preset rule and the feedback information, and pushing the fourth pushing resource to the user. In the solution, if the smart device cannot determine the user's attitude, it can re-acquire a resource based on the feedback information and the preset rule, then push the re-acquired resource to the user, and continue to acquire feedback information from the user on new pushing resources.

In the solution, if the number of times for which an attitude of the user toward a resource cannot be determined according to the feedback information exceeds a preset number of times, the smart device may exit the resource pushing process; or, play a guidance voice used to query an attitude of the user, acquire a third voice of the user, and acquire a fifth pushing resource according to the third voice to push to the user, re-learn the user's attitude to acquire new resources for pushing; or, continue to play the resource that has already been acquired.

In the resource pushing method provided by the embodiment, the smart device can determine whether the user's attitude is positive or negative according to the feedback information of the user on the pushed resource, then continue to play the resource according to the user's attitude or re-acquire a resource to push to the user, or can also perform voice interaction with the user to further understand the user's preferences, and acquire a more suitable resource to push to the user, thus efficiently recommending more suitable matched resources for the user, improving the user experience, and increasing the exposure of many resources.

According to the resource pushing solution introduced in the above solution, it is necessary to interact with the user in the specific application process of the solution. At present, voice interaction is the main research direction in the industry, therefore, the resource pushing solution in the solution also involves resource pushing based on the voice interaction and active resource pushing without the voice interaction or resource pushing based on subscription. It should be understood that the resource and the pushed resource appearing in the subsequent examples have the same meanings, and all refer to the resource that the smart device acquires to interact with the user. In the following, a resource pushing method will be described with reference to several specific examples.

Embodiment 1

According to a resource querying record of a user in a network, a probability that the user continuously browses a same related resource in a short period of time is high, for example, the user is querying a TV drama, take the TV drama "Old Nine Gates" as an example. In the same period of time, the user will query various information about "Old Nine Gates", such as cast members, broadcast time, topics, tombs, tomb notes and other related resources, based on this, the solution proposes a global resource recommendation solution.

Specifically, in the solution, the smart device can learn a keyword of the content that the user is interested in according to the interaction with the user in the form of voice, or other interactions, then acquires a resource according to the keyword in a network database or the like. For example, after encyclopedia, seconds understand encyclopedia, KG question and answer, general question and answer, it can recommend topic-related physical resources to the user in the form of semi-floating layers.

In a specific implementation of the solution, the resource recommendation triggered by the news keyword is taken as an example, and the specific keyword that may appear in the news may be as shown in Table 1 below.

TABLE 1

| Keyword | Type |
| --- | --- |
| Football, Basketball, NBA, Tennis, Olympics, Asian Games, Winter Olympics, Premier League | Sports |

TABLE 1-continued

| Keyword | Type |
| --- | --- |
| Xiaomi, Baidu, Ali/Alibaba, Tencent, Didi | Technology |
| Shanghai Stock Exchange Index, Stocks, Securities, Finance, Exchange Rates, House Prices | Finance and economics |
| Trump, Putin, Xi Jinping, United Nations (or the appearance of national leaders) | Politics |

In a specific implementation, the smart device can also retrieve resources in videos, short videos, news, music, audios, and encyclopedia bots, and push the resources, however, it is possible to retrieve a large number of resources, at this time, the resource results may be sorted according to the number of times for which they have been played, and one or more resources with the highest number of playing times may be recommended, the number of resources can be limited to, for example, 4. Besides, the filtering may also be performed according to a preset rule or condition during the filter process, for example, it may be set to remove a resource whose absolute value of the number of playing times is less than 10 times (the specific value is determined according to the situation during offline evaluation), that is, the resource will not be recommended.

If the above resources are pushed in the speaker, the smart device retrieves the resource results in music, audios, news, encyclopedia bot, sorts according to the number of times for which the resource results have been played, and recommends the resource with the highest number of playing times, and can broadcast directly. Similarly, a rule may be set as to not recommend the resource whose absolute value of the number of playing times is less than 10 times (the specific value is determined during offline evaluation according to situations).

Taking a speaker as an example, the interaction logic between the speaker and the user can be specifically as follows:

(1) After playing the filtered resources, the speaker can continue playing a guidance voice to the user, query an attitude of the user, for example, "Xiaodu also found music/audios/encyclopedias/news contents related with the "keyword" for you, can we listen together?", the specific phonetic structure or speech structure can be determined according to the type of the resource.

(2) Multiple rounds of voice interaction. Specifically, after broadcasting the set speech voice, the speaker enters into an automatic listening state, plays the acquired music resource if the user's answer is positive, or can exit the recommendation or interaction process if the user's answer is negative or other query content.

Embodiment 2

In addition to the above-mentioned global recommendation based on user triggering, the present disclosure also provides a recommendation method based on behavior information of the user. The behavior information of the user here includes at least one of a scene, weather, a location, a time period, a user's play record, and the like, which is not limited herein. The solution will be described in detail below.

(1) Weather-Based Resource Recommendation

Taking the weather as an example, a rule for recommending related resources according to the weather can be set in advance, for example, a rule may be set as follows: personalized recommendation of resource entities for users when weather conditions meet certain conditions, the recommended content is acquired based on user history data.

The personalized resource library set under this rule contains: opened resources in the history (playing in the middle, played out but there are still remaining episodes, new episodes are released after played out; children's resources which have been played for many times), popular resources, personalized recommendation resources (resources similar to resources opened by the user in the history, resources similar to those often seen by the user). If there are a plurality of resources to be recommended, the plurality of resources can be sorted. Specifically, a sorting factor that affects the sorting includes at least one of following: the number of opening times by the user, the similarity, the hot. The type of the resource acquired by the smart device can be at least one of music, a video, a short video, a voice and news.

A Specific Recommendation Logic: (1) Limitation on the Trigger Condition

Appearing after the broadcasting by the weather bot is finished; avoiding other playing modes; avoiding speech recommendation in the weather bot; avoiding scenes in series.

(2) Resource Recommendation Based on a Time Period

The smart device can also acquire resources according to the time period during which the user interaction is conducted, or sort according to the user's behavior tendency during the time period.

Specific time periods include: a behavior habit of the user in the morning, forenoon, noon, afternoon, evening, and late night (working days and weekends are counted in groups). Learning or counting in advance to understand the behavior of the user at each time period, or the habit of accessing what resources, for example, if the user has a bot tendency during this time period, sorting according to the bot tendency, if the user has triggered the music bot 4 times in the past week and triggered the short video bot 3 times, then the resources from the music bot are uniformly arranged before the short videos. If the user has a tag tendency during this time period, then sorting the order within the bot according to the tag tendency, if the user has triggered "Teng Lijun Music" 3 times in the past week and triggered "Andy Lau Music" 2 times, sorting inside the music bot resource as "Teng Lijun Music">"Andy Lau Music">Other Music.

Specific recommendation logic and methods and speech can be set. A specific recommendation logic may be user & time limit, for example:

offline mining user behavior data in the first phase during the time period, selecting users who have high frequent content consumption behaviors (music, voices, news) in the evening (17-22) for experiment.

Triggering period: 17-22 every day, triggering at most once in this period every day.

(3) Classification According to the Population Conducting the Interaction

The smart device identifies the user who triggered the interaction, generally, it can analyze according to an audio, for example, a voiceprint to recognize whether the user is an adult or a child, specifically, when the voiceprint that triggers the query is recognized as an adult, child resources are removed from recommended resources;

when the voiceprint that triggers the query is recognized as a child, non-child content are removed from recommended resources.

In the specific implementation of the above several methods, a specific recommendation logic for recommending resources by the smart device to the user can be implemented as shown in Table 2 below: in the first two times, performing the recommendation by querying the user (query recommendation); in the third time and later times, performing long-term recommendation or not recommending (recommendation in the form of query may be triggered at most once in a single day) according to the user's feedback.

TABLE 2

| User feedback | First 2 triggers | 3rd trigger | 4th and later |
| --- | --- | --- | --- |
| Type 1 | Users accept recommendations | Direct access to recommendations | Direct access to recommendations |
| Type 2 | Two rejections Two other replies One rejection, one other reply | No longer recommend | No longer recommended |
| Type 3 | One acceptance, one rejection One acceptance, one other reply | Query recommendation | According to the first 3 cases: If the recommendation has been accepted twice, then direct recommend in the following triggers In other cases, no longer perform follow-up recommendations |

Figure 3:
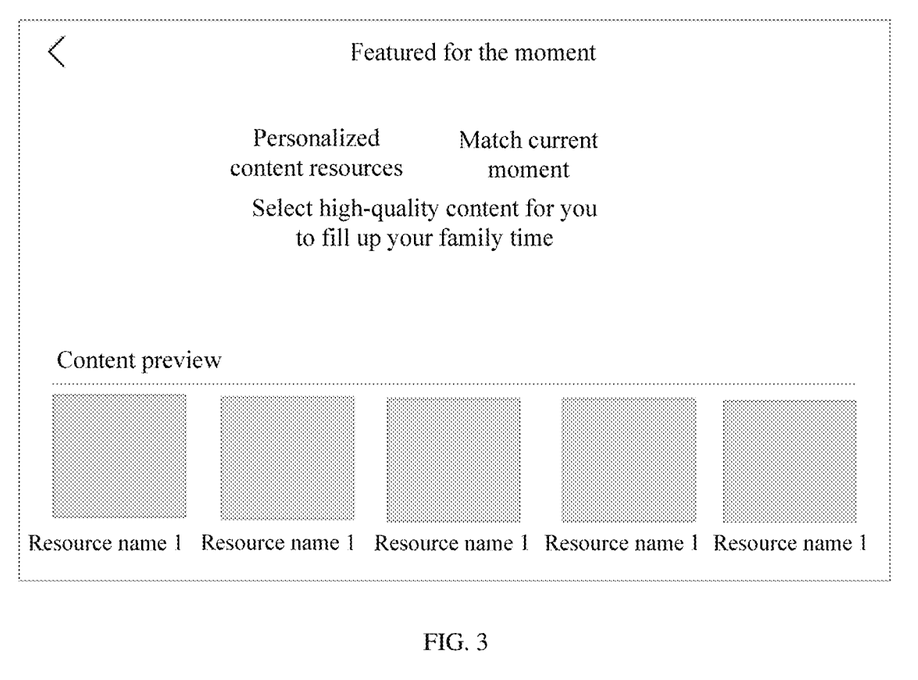
FIG. 3 is a resource pushing and displaying interface of a resource pushing method for a smart device according to an embodiment.

On the smart device side, in addition to directly broadcasting the voice to the user, the recommendation result can also be directly displayed. FIG. 3 is a resource pushing and displaying interface of a resource pushing method for a smart device according to the embodiment. As shown in FIG. 3, the figure shows the name of the resource filtered by the smart device, that is, the name of the resource and the picture in the content preview.

Embodiment 3

Based on the above several solutions, the resource pushing method may also be triggered according to a specific vocabulary or be implemented by acquiring corresponding resources according to the subscription information.

In an implementation of artificial intelligence, at present, the scene combination type for "good morning" is "history today"+"weather"+"news/sound/music", the pushing content tends to be daily routine information of the public, which lacks personalized content that is refined to the daily attention of each user, it is thus difficult to generate a feeling of surprise during the use of the speaker. If the information that the user cares about can be pushed dynamically, then "Good Morning" will go further in the direction of "Personal Customization Good Morning" and the user experience will be improved.

In addition to the above two solutions, the voice of the user can be associated with the scene, for example, the personalization of scene series may be realized in "Good Morning", the user can keep abreast of the dynamics of his concerns, the smart device can be used as a smart assistant to capture the information that the user cares about and can remind the user promptly, the daily life of the user may be intelligentized, and the AI smart color of the smart device (such as the Xiaodu speaker) may also be improved.

In the following, an example is taken where the smart speaker is set at home, the smart speaker can locate and count user concerned tags according to a big data search or offline mining, if the user's concerned tag has a feature of "triggered information", dynamic information of the user's concerned tag is added to "Good Morning" to broadcast to the user.

Inform the user to inform in the "Good Morning", and the user's subconscious reaction is to say "Good morning", if it is not in the morning, the user's concerned information is not updated, there is no surprise. The reasonable process is as follows: directed hits>>directed to join the good morning package>>directed popularization.

Take traffic control as an example (at present, the traffic control bot only performs daily tracking and changing for Beijing and Tianjin, the popularization of the traffic control can be first directed to Beijing and Tianjin):

If the user has used the traffic control bot during the period of 5:30-11:30 am, and the target specific city is tentatively set as Beijing/Tianjin, then, after normal broadcast is completed, adding a good morning popularization speech, for example: "By the way, you may pay more attention to the traffic control situation in Beijing. Good morning to Xiaodu, when the tail numbers of the traffic control change, Xiaodu will tell you!"

Example: Good Morning (Traffic Control).

Triggering Good morning after the first bot: "History Today"+"Weather"+"Xiaodu already knows your concern about the traffic control in Beijing. The traffic control is XXX, if there is a change in the next traffic control, I will update my reminder in the good morning!"+"Music/Afternoon/Broadcast"; the good morning is triggered later and the information changes: "History Today"+"Weather"+"Beijing today's traffic control is XX ~"+"Music/Afternoon/Broadcast", the good morning is triggered later and the information does not change: "History Today"+"Weather"+"Music/Afternoon/Broadcast". In the solution, different cuids can be configured according to different user concerned tags, which is not limited herein.

In the specific implementation of the solution, the user may generate multiple attention tags, up to 2 types in 5 types of tags are pushed, a reference order for pushing among types is as follows: traffic control>stocks>hottest recommendation>team scores>horoscope, the order can be determined based on feedback from the user on the pushed resources or access records.

Embodiment 4

In addition to the above several implementations, the smart device can also recommend related resources according to the news hotspot or hotspots in a period of time. Knowing hotspot events is an indispensable source of information for a user every day, so actively recommending hotspot events to the user in a recommended line can satisfy the user's demand for time-sensitive information. In the resource pushing solution, the triggering condition of the pushing process may be as follows: if a hotspot event is detected on the day, proactively recommending corresponding video/audio news to the user, and supporting the user to switch among different hot contents in the form of voice.

Triggering Entry Includes:

a specific entry: for example, after played an information bot such as a time bot, a weather bot, querying if the user interested in the news wants to know the hot event of the day;

a general entry: if the user does not conduct a specific query or has no personalized tendency, querying if the user wants to know the hotspot event of the day.

Take the smart speaker as an example, the voice interaction between the user and the smart speaker can be as follows:

Example 1

The user: Xiaodu, Xiaodu, how is the weather today?
Xiaodu: Today's weather is xxxx. Today, "Typhoon Yutu" has happened. Do you want to know about it?

Example 2

The user: Xiaodu, Xiaodu, Good morning!
Xiaodu: Good morning, Xiaodu has prepared hotspots that you might be interested in, such as "the most handsome bend", would you like to know about it?

In the specific implementation of the above resourcing push solutions, after the relevant resources are recommended to the user, the feedback information from the user may be acquired, specifically, the user's intention can be determined directly according to the meaning indicated in the voice of the user, there is also a possibility that the user has made no feedback, at this time the smart device can query the user's opinion.

An example is taken where the user queries a resource through an encyclopedia, the smart device can broadcast "Are you satisfied with this answer?" After receiving the user's feedback, the smart device can reply, "Xiaodu has received your feedback".

If the user is not satisfied with the recommended resource or the searched resource, the smart device can "learn more" through the encyclopedia and show it to the user, and optimize the content for presentation: all encyclopedia texts show the full summary, replacing the first three sentences in the current encyclopedia.

In an implementation, in another way of interaction, more information can be learned through the user's triggering. The smart device can be implemented in following steps:

STEP1: after the broadcasting of the first three sentences is completed, the highlight and stay at the third sentence;

STEP2: turn on active multi-round interaction and query "Do you want to know more, please say yes, or no".

STEP3: if the user expresses a positive attitude, open a new page to broadcast the remaining content, return to the top of the page and exit after all the content is broadcasted.

If the user expresses a negative attitude, return to the text of the encyclopedia first, then return to the top of the encyclopedia and exit;

if the user enters a meaningless word, the smart device can broadcast "Sorry, I didn't hear it, you can say yes or no to me", if the user enters a meaningless word for three times in a row, the smart device can reply "Sorry, I don't know yet, * * will study hard", return to the text of the encyclopedia first, then return to the top of encyclopedia and exit;

if the user has no feedback, after the system monitors automatic timeout (8 s), return to the text of the encyclopedia first, then return to the top of the encyclopedia and exit;

if the user does not trigger "learn more": after the first three sentences are broadcasted, do not continue broadcasting the remaining text, return directly to the top of the encyclopedia and exit.

In the implementation of any of the above solutions, the selection of the recommended resources includes strategy based generation and backup solution. Overall, if the quality generated according to the strategy is ok, the content of the strategy generation is prioritized; if the quality is poor, the backup solution is adopted for supplementation (For example, Q=encyclopedia for artificial intelligence, using query to recommend pages, a total of 3 query is recommended, one of the queries according to the strategy generation is available, then the remaining two are supplemented with the query according to the backup solution). In addition, traffic not covered by the strategy generation (such as Q=today's traffic control) can also be supplemented with the backup solution.

The strategy generation solution is divided as recommending a data source, recommending a data strategy and recommending data filtering.

Regardless of any of the above resource pushing, the interaction between the smart device and the user is no more than following:

(1) Texts, graphics, stock specific types pages; for example, automatically closing the recommendation page in the first 5s, and presenting the recommendation page for 10s. (The value is tentative, which can be optimized according to the display effect on the smart device)

(2) Videos; displaying the recommendation page immediately after completing the playing. For example, presenting the recommendation page for 10s.

(3) Picture specific types; for example, whether automatically playing or manually touching by the user, triggering the recommendation page when displaying the 20th piece, and presenting the recommendation page for 10s.

(4) Audio broadcasting; for example, after playing the first audio, querying the user whether to continue playing or exiting in the form of voice.

Finally, it should be understood that in the specific implementation of the resource pushing method, generally the interaction between the user and the smart device is not simply a single round of interaction, and in many scenes, multiple interactions between the user and the smart device may occur. In the following, the voice interaction is taken as an example for detailed description of the solution.

(I) Single Round of Dialogue

The smart device can simply recommend to the user without dialoguing with him. When the user's current demand for the recommendation is not clear enough, the interaction is relatively weak, and the smart device simply recommends without performing sound pickup.

Example: after broadcasting the weather to the user, it can continue playing: actually ** (such as Xiaodu) is very smart, you can also ask me directly, will you catch a cold tomorrow?

In the case where the user's demands are relatively clear, offer one or more options to the user, and playing after the user gives a positive answer or selects an option; in a deterministic scene, the recommendation of a single round of dialogue is a more efficient recommendation manner, which is applicable to the case where the user's demands are within a small scope.

Example: Keyword Based Recommendation if there is No Result.

The smart device can broadcast: I don't fully understand, but I found other content related to Andy Lau for you. Which one do you want to play? At the same time, the resource list is displayed on the front end of the smart device, and the one in the user's answer is played.

Recommendation after the Information is Satisfied

The smart device can broadcast (on the speaker side): ** also found the music content related to "Andy Lau" for you, let's listen to it or not? If the user answers positively, then play.

(II) Multi-Round Dialogue Recommendation

A multi-round dialogue strategy is a strategy to maintain the consistency of the dialogue logic in multiple rounds, which can be applied in recommended interactions, is applicable to relatively uncertain scenes where a clear understanding of the user's demands is unavailable, and can provide more emotional experiences.

In the specific implementation process, the smart device can collect user information through multiple rounds of dialogue in an uncertain scene, and make targeted recommendations, the interaction manner is closer to the dialogue between people, and the interaction is more natural, which can bring more emotional experiences to the user.

For Example, (1) Scene Demands

The scene in which the user says "I am back" to the device, is a scene that the user goes back home after work on a working day or goes back home after going out on weekends, potential demands are relaxation, kill time, companionship, acquiring information, the user's demands may be met through suitable content consumption, the user says "I am back" to the device, the underlying information is that the user anthropomorphizes the device, greets the machine with a tone as in a conversation with the person, and expects to receive the same anthropomorphic response and interaction from the machine. Specifically, the interaction with the user may be performed according to the following mechanism.

First of all, the smart device gets through a multi-round dialogue recommendation mechanism after "I am back", puts emotion-music topic online and conducts experiments;

Secondly, when the solution is implemented, multiple daily topics+hotspots, festivals and the like may be continuously built around the "I am back" scene, and a mechanism that supports more flexible topic setting and online is built.

Further, a linkage with personalized recommendation of an evening radio station can be get through (the user information is collected by the topic recommended by the conversation so as to optimize the personalized recommendation content).

Example 1: Q represents the user, A represents the smart device:

Q=I am back.

A=Come back, I think the moment you enter the door, the room gets warm! I don't know if you are in a good mood today?

Q=I am in a good mood today!

A=You are happy! I bet, you must have met good news at work, right?

Q=How did you know?

A=I am so magical, of course I know everything! Here is a song for you, I am very proud of you!+Playing high-sounding songs In addition to the specially set trigger mechanism, multiple rounds of voice interaction can be triggered according to the feedback information of the user during the resource pushing process, it can be initiated by the smart device, or initiated by the user, which is not limited herein.

Example 2: an example is taken where the user has queried for hot news about airline flights, after the push is over, the smart device can also interact with the user as follows:

the smart device: ** there are also some hotspots that you might be interested in, for example, the hot word "the most handsome bend", would you like to know about it? [Multiple recommendation strategies];

the user: change one [the user indicates a neutral attitude in the feedback information];

the smart device: ok. What about the "the most powerful airline flight in history"? Are you interested in this news?

the user: this is good [the user indicates a positive attitude in the feedback information];

the smart device: a certain university, celebration party, J-20 chief designer Yang Wei, Y-20 chief designer Tang Changhong and J-15 executive chief designer Zhao Xia, perform poetry reading "Zhiyuan Fang" together. It is understood that the chief designers of J-10, FC-1, J-15, J-20, J-7, Y-20 and other aircrafts also come from their class. Netizen comment: a class holds up a blue sky. Do you want to see the "Y-20 encyclopedia" just mentioned? [Details+continue recommending content];

the user: take a look at it [the user indicates a neutral attitude in the feedback information];

the smart device: <play Seconds understand encyclopedia of the Y-20>;

the user: ****, I know. [the user indicates a neutral attitude in the feedback information];

the smart device: ok. However, I have other interesting related content, such as the "Y-30" encyclopedia, do you want to know?

the user: No, continue to play "**" (which can be a piece of music) [the user indicates a negative attitude in the feedback information];

the smart device: play the user-specified "**".

The multi-round interactive resource pushing method provided by the present disclosure can be used to collect user current information so as to optimize personalized content on the basis of a fast resource search query, thereby improving a resource recommendation efficiency.

Figure 4:
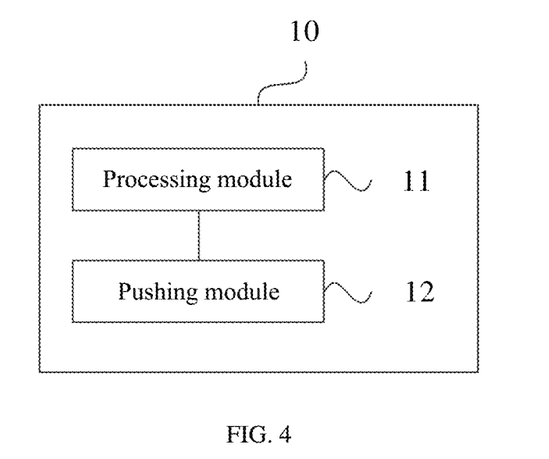
FIG. 4 is a schematic structural diagram of Embodiment 1 of a smart device according to an embodiment of the present disclosure.

FIG. 4 is a schematic structural diagram of Embodiment 1 of a smart device according to an embodiment of the present disclosure. As shown in FIG. 4, the smart device 10 includes:

a processing module 11, configured to acquire a first pushing resource according to a preset rule, where the first pushing resource is used by the smart device to interact with a user; and a pushing module 12, configured to push the first pushing resource to the user.

In an implementation, the preset rule includes at least one of following:

determining a pushing resource according to a news hotspot;

determining a pushing resource according to behavior information of the user;

determining a pushing resource according to a keyword of user feedback, determining a pushing resource according to an identity of the user;

determining a pushing resource according to subscription information of the user.

The smart device provided in the embodiment is used to implement the resource pushing method of the user smart device in any of the foregoing method embodiments, the implementation principle and technical effect are similar, and will not be described herein.

Figure 5:
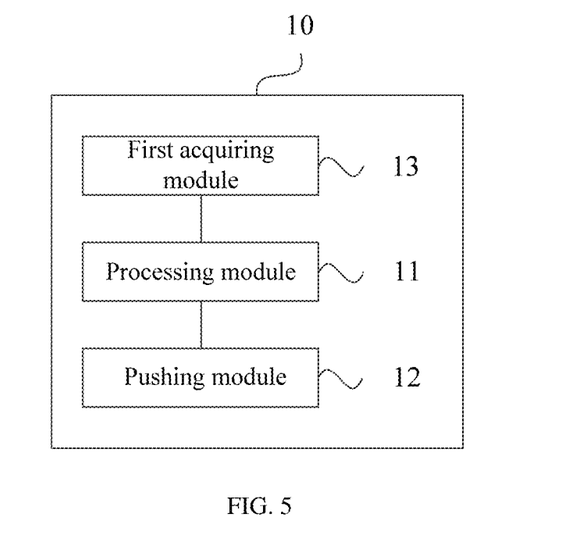
FIG. 5 is a schematic structural diagram of Embodiment 2 of a smart device according to an embodiment of the present disclosure.

FIG. 5 is a schematic structural diagram of Embodiment 2 of a smart device according to an embodiment of the present disclosure. As shown in FIG. 5, based on the above embodiment, the smart device 10 further includes:

a first acquiring module 13, configured to acquire a first voice of the user;

correspondingly, the processing module 11 is specifically configured to acquire the first pushing resource according to the first voice of the user and the preset rule.

In an implementation, the processing module 11 is specifically configured to:

acquire the first pushing resource to be pushed according to the first voice and a news hotspot, where the preset rule includes determining a pushing resource according to a news hotspot;

or, acquire the first pushing resource to be pushed according to the first voice and the behavior information of the user of the user, where the preset rule includes determining a pushing resource according to behavior information of the user;

or, acquire the first pushing resource to be pushed according to a keyword in the first voice, where the preset rule includes determining a pushing resource according to a keyword;

or, determine, according to the first voice, whether an identity of the user is an adult or a child; acquire a plurality of resources according to the first voice, and remove resources that are inconsistent with the identity of the user from the plurality of resources to acquire the first pushing resource, where the preset rule includes determining a pushing resource according to an identity of the user.

In an implementation, the processing module 11 is specifically configured to:

acquire the first pushing resource to be pushed according to a news hotspot, where the preset rule includes determining a pushing resource according to a news hotspot;

or, acquire the first pushing resource to be pushed according to behavior information of the user of the user, where the preset rule includes determining a pushing resource according to behavior information of the user;

or, collect a voice of the user, determine whether an identity of the user is an adult or a child according to the voice, and acquire the first pushing resource according to the identity of the user, where the preset rule includes determining a pushing resource according to an identity of the user;

or, acquire the first pushing resource according to subscription information of the user pushing resource, where the preset rule includes determining a pushing resource according to subscription information of the user.

In an implementation, the behavior information of the user includes at least one of following:

time information, location information, historical resource access information, weather information.

Figure 6:
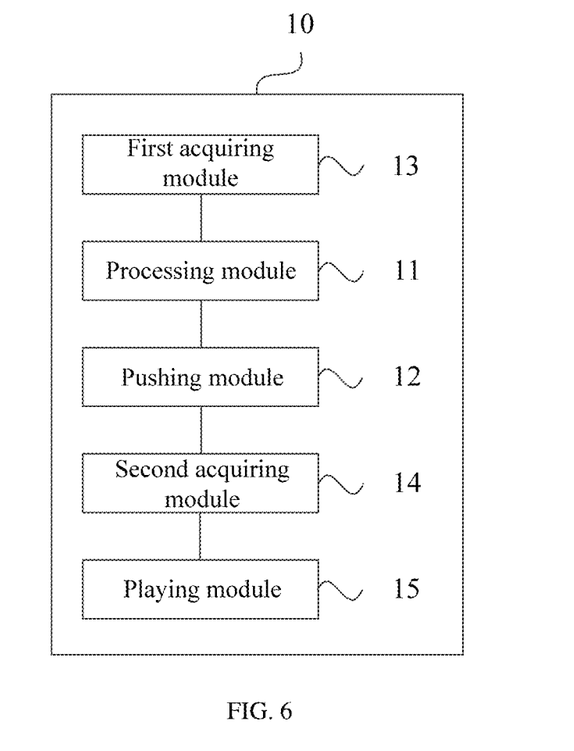
FIG. 6 is a schematic structural diagram of Embodiment 3 of a smart device according to an embodiment of the present disclosure.

FIG. 6 is a schematic structural diagram of Embodiment 3 of a smart device according to an embodiment of the present disclosure. As shown in FIG. 6, based on any of the above embodiments, the smart device 10 further includes:

a second acquiring module 14, configured to acquire feedback information for the first pushing resource from the user, where the feedback information is information indicating an attitude of the user toward the first push resource.

In an implementation, the processing module 11 is further configured to:

if it is determined, according to the feedback information, that the user has a positive attitude toward the first pushing resource, after playing the first pushing resource, acquire at least one second pushing resource related to the first pushing resource and push it to the user.

In an implementation, if it is determined according to the feedback information that the user has a negative attitude toward the first pushing resource, the processing module 11 is further configured to exit a resource pushing process;

or,

In an implementation, the smart device 10 further includes:

a playing module 15, configured to play a guidance voice, the guidance voice is used to query an attitude of the user; the second acquiring module 14 is further configured to acquire a second voice of the user to acquire a third pushing resource according to the second voice to push to the user;

or, the smart device further includes: a playing module 15, configured to play the first pushing resource.

In an implementation, if the attitude of the user toward the pushed first pushing resource cannot be determined according to the feedback information, the processing module 11 is further configured to re-acquire a fourth pushing resource to be pushed according to the preset rule and the feedback information; and the pushing module 12 is further configured to push the fourth pushing resource to the user.

In an implementation, if a number of times for which an attitude of the user toward a resource cannot be determined according to the feedback information exceeds a preset number of times, the processing module 11 is further configured to exit the resource pushing process;

or, a playing module 15, configured to play a guidance voice used to query an attitude of the user; the second acquiring module 14 is further configured to acquire a third voice of the user to acquire a fifth pushing resource according to the third voice to push to the user;

or, a playing module 15, configured to play the first pushing resource.

In an implementation, the second acquiring module 14 is specifically configured to:

acquire a fourth voice of the user, where the fourth voice is a voice of the user after pushing the first pushing resource; and acquire the feedback information according to the fourth voice.

In an implementation, the second acquiring module 14 is specifically configured to:

acquire the feedback information according to an operation of the user in a process of playing the first pushing resource.

In an implementation, a number of resources in the first pushing resource is plural, before pushing the first pushing resource to the user, the processing module is further configured to:

sort the plurality of resources in the first pushing resource.

In an implementation, the processing module 11 is specifically configured to:

sort the plurality of resources in the first pushing resource according to at least one of a number of times of browsing, a similarity, and popularity of each resource.

Figure 7:
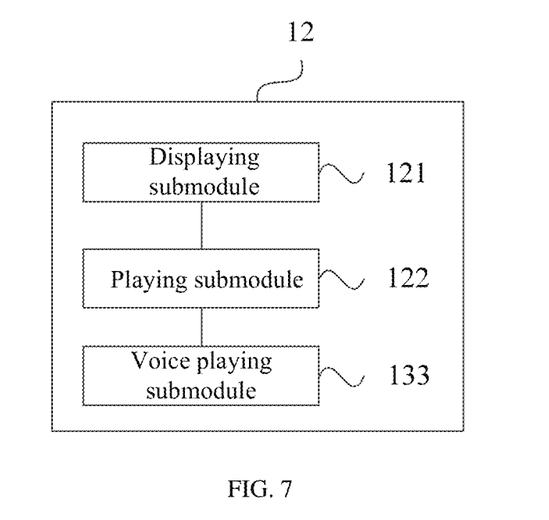
FIG. 7 is a schematic structural diagram of Embodiment 4 of a smart device according to an embodiment of the present disclosure.

FIG. 7 is a schematic structural diagram of Embodiment 4 of a smart device according to an embodiment of the present disclosure. As shown in FIG. 7, on the basis of any of the foregoing embodiments, the pushing module 12 specifically includes at least one of following submodules:

a displaying submodule 121, configured to display resource information in the first pushing resource;

or, a playing submodule 122, configured to play a plurality of resources in the first pushing resource in order;

or, a voice playing submodule 123, configured to perform voice broadcasting in order according to the plurality of resources in the first pushing resource.

The smart device provided by any of the foregoing embodiments is used to implement the resource pushing method in any of the foregoing method embodiments, and the implementation principle and technical effects are similar, and details are not described herein again.

Figure 8:
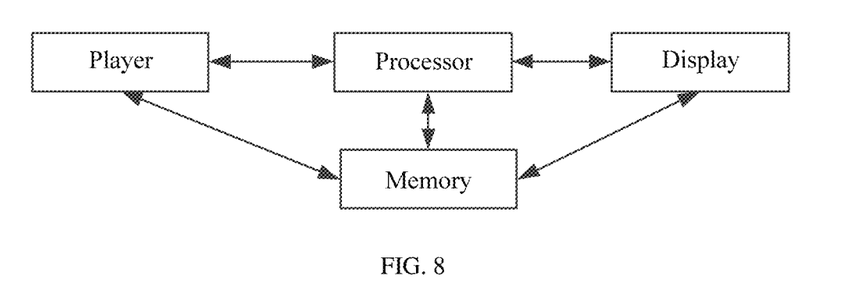
FIG. 8 is a schematic structural diagram of Embodiment 5 of a smart device according to an embodiment of the present disclosure.

FIG. 8 is a schematic structural diagram of Embodiment 5 of a smart device according to an embodiment of the present disclosure, As shown in FIG. 8, the smart device includes:

a processor, a memory, a player, and a computer program; the computer program is stored in the memory, the processor executes the computer program to implement the resource pushing method for a smart device according to any of the foregoing method embodiments.

The present disclosure also provides a computer readable storage medium, the computer readable storage medium stores a computer program, the computer program is used to implement the resource pushing method for a smart device according to any of the foregoing method embodiments.

In the above embodiment of the smart device, it should be understood that the processor may be a central processing unit (CPU), or may be another general purpose processor, a digital signal processor (DSP), or an application specific integrated circuit (ASIC) and the like. The general purpose processor may be a microprocessor or the processor may be any conventional processors and the like. The steps of the method disclosed in the present disclosure may be directly implemented by a hardware processor, or may be executed by a combination of hardware and software modules in the processor.

One of ordinary skill in the art can understand that all or part of the steps of implementing the foregoing method embodiments may be completed by hardware related to the program instructions. The aforementioned program can be stored in a computer readable storage medium. When the program is executed, the steps including the above method embodiments are performed. The aforementioned storage medium includes: a read-only memory (ROM), a RAM, a flash memory, a hard disk, a solid state hard disk, a magnetic tape, a floppy disk, an optical disc and any combination thereof.

Finally, it should be noted that the above embodiments are only used to illustrate the technical solution of the present disclosure, and the present disclosure is not limited thereto; although the present disclosure has been described in detail with reference to the foregoing embodiments, it should be understood by those skilled in the art that the technical solutions described in the foregoing embodiments may be modified, or some or all of the technical features may be equivalently replaced; and the modifications or substitutions do not deviate the nature of the corresponding technical solution from the scope of the technical solutions of various embodiments according to the present disclosure.

What is claimed is:

1. A resource pushing method for a smart device, comprising:

acquiring a first pushing resource according to a preset rule, wherein the first pushing resource is used by the smart device to interact with a user; and pushing the first pushing resource to the user;
acquiring feedback information for the first pushing resource from the user, wherein the feedback information is information indicating an attitude of the user toward the first pushing resource;
if the attitude of the user toward the pushed first pushing resource cannot be determined according to the feedback information, re-acquiring a second pushing resource according to the preset rule and the feedback information; and
pushing the second pushing resource to the user;
wherein if a number of times for which an attitude of the user toward a resource cannot be determined according to the feedback information exceeds a preset number of times, the method further comprises:
playing a guidance voice used to query an attitude of the user, acquiring a first voice of the user, and acquiring a third pushing resource according to the first voice to push to the user.

2. The method according to claim 1, wherein the preset rule comprises at least one of following:
determining a pushing resource according to a news hotspot;
determining a pushing resource according to behavior information of the user;
determining a pushing resource according to a keyword of user feedback,
determining a pushing resource according to an identity of the user; and
determining a pushing resource according to subscription information of the user.

3. The method according to claim 2, wherein before the acquiring a first pushing resource according to a preset rule, the method comprises:
acquiring a second voice of the user;
the acquiring the first pushing resource according to the preset rule comprises:
acquiring the first pushing resource according to the second voice of the user and the preset rule.

4. The method according to claim 2, wherein the behavior information of the user comprises at least one of following:
time information, location information, historical resource access information, and weather information.

5. The method according to claim 1, further comprising:
if it is determined, according to the feedback information, that the user has a positive attitude toward the first pushing resource, after the first pushing resource is played, acquiring at least one additional pushing resource related to the first pushing resource pushing to the user.

6. The method according to claim 1, wherein if it is determined according to the feedback information that the user has a negative attitude toward the first pushing resource, the method further comprises at least one of following:
exiting a resource pushing process;
playing a guidance voice used to query an attitude of the user, acquiring a second voice of the user, and acquiring a fourth pushing resource according to the second voice to push to the user; and
playing the first pushing resource.

7. The method according to claim 1, wherein the acquiring feedback information for the first pushing resource from the user comprises:
acquiring a second voice of the user, wherein the second voice is a voice of the user after pushing the first pushing resource; and
acquiring the feedback information according to the second voice.

8. The method according to claim 7, wherein the acquiring the feedback information according to the second voice further comprises:
performing multiple rounds of voice between the smart device and the user.

9. The method according to claim 1, wherein the acquiring feedback information for the first pushing resource from the user comprises:
acquiring the feedback information according to an operation of the user in a process of playing the first pushing resource.

10. The method according to claim 1, wherein a number of resources in the first pushing resource is plural, before the pushing the first pushing resource to the user, the method further comprises:
sorting the plurality of resources in the first pushing resource according to at least one of a number of times of browsing, a similarity, and popularity of each resource.

11. The method according to claim 1, wherein the pushing the first pushing resource to the user comprises at least one of following ways:
displaying resource information in the first pushing resource; or,
playing a plurality of resources in the first pushing resource in order; or,
performing voice broadcasting in order according to the plurality of resources in the first pushing resource.

12. A non-transitory computer readable storage medium storing a computer program, the computer program is configured to implement the resource pushing method for a smart device according to claim 1.

13. A smart device, comprising a processor, a memory, a player, and a computer program; the computer program is stored in the memory, the processor executes the computer program to:
acquire a first pushing resource according to a preset rule, wherein the first pushing resource is used by the smart device to interact with a user; and
push the first pushing resource to the user;
acquire feedback information for the first pushing resource from the user, wherein the feedback information is information indicating an attitude of the user toward the first pushing resource;
if the attitude of the user toward the pushed first pushing resource cannot be determined according to the feedback information, re-acquire a second pushing resource according to the preset rule and the feedback information; and
push the second pushing resource to the user;
wherein if a number of times for which an attitude of the user toward a resource cannot be determined according to the feedback information exceeds a preset number of times, the processor further executes the computer program to implement the following:
play a guidance voice used to query an attitude of the user, acquire a first voice of the user, and acquire a third pushing resource according to the first voice to push to the user.

14. The smart device according to claim 13, wherein the preset rule comprises at least one of following:
determining a pushing resource according to a news hotspot;
determining a pushing resource according to behavior information of the user;

determining a pushing resource according to a keyword of user feedback;

determining a pushing resource according to an identity of the user; and determining a pushing resource according to subscription information of the user.

15. The smart device according to claim 14, wherein the processor further executes the computer program to:

acquire a second voice of the user;

the processor executes the computer program to acquire the first pushing resource according to the first voice of the user and the preset rule.

16. The smart device according to claim 13, wherein a number of resources in the first pushing resource is plural, before pushing the first pushing resource to the user, the processor further executes the computer program to:

sort the plurality of resources in the first pushing resource according to at least one of a number of times of browsing, a similarity, and popularity of each resource.

17. The smart device according to claim 13, wherein the processor executes the computer program to implement at least one of following:

displaying resource information in the first pushing resource; or, playing a plurality of resources in the first pushing resource in order; or, performing voice broadcasting in order according to the plurality of resources in the first pushing resource.

18. The smart device according to claim 13, wherein if it is determined according to the feedback information that the user has a negative attitude toward the first pushing resource, the processor further executes the computer program to implement at least one of following:

exiting a resource pushing process;

playing a guidance voice used to query an attitude of the user, acquiring a second voice of the user, and acquiring a fourth pushing resource according to the second voice to push to the user; and playing the first pushing resource.

* * * * *